United States Patent
Wang (10) Patent No.: US 11,089,037 B2
(45) Date of Patent: Aug. 10, 2021

(54) METHOD FOR AUTOMATICALLY RETRIEVING WORKFLOW AND METHOD FOR DETECTING INTRUSION IN DISTRIBUTED SYSTEM

(71) Applicant: Siemens Healthcare GmbH, Erlangen (DE)

(72) Inventor: Cheng Wang, Shanghai (CN)

(73) Assignee: Siemens Healthcare GmbH, Erlangen (DE)

( * ) Notice: Subject to any disclaimer, the term of this patent is extended or adjusted under 35 U.S.C. 154(b) by 69 days.

(21) Appl. No.: 16/704,251

(22) Filed: Dec. 5, 2019

(65) Prior Publication Data

US 2020/0186551 A1 Jun. 11, 2020

(30) Foreign Application Priority Data

Dec. 6, 2018 (CN) .......................... 201811485731.4

(51) Int. Cl.
*G06F 15/16* (2006.01)
*H04L 29/06* (2006.01)
*G06F 16/901* (2019.01)
*H04L 29/08* (2006.01)
*H04L 12/751* (2013.01)

(52) U.S. Cl.
CPC ...... *H04L 63/1416* (2013.01); *G06F 16/9024* (2019.01); *H04L 45/02* (2013.01); *H04L 63/1425* (2013.01); *H04L 67/10* (2013.01)

(58) Field of Classification Search
USPC ............................................. 709/200; 726/23
See application file for complete search history.

(56) References Cited

U.S. PATENT DOCUMENTS

| 3,824,532 | A | * | 7/1974 | Vandierendonck | .... G01V 1/001 367/136 |
|---|---|---|---|---|---|
| 8,121,973 | B2 | * | 2/2012 | Anderson | ............. G06F 11/328 706/62 |
| 8,364,642 | B1 | * | 1/2013 | Garrod | ................ G06F 16/1865 707/648 |
| 2014/0250050 | A1 | * | 9/2014 | Lospinoso | ............. G06N 7/005 706/52 |
| 2019/0311281 | A1 | * | 10/2019 | Lospinoso | ............. G06N 5/022 |
| 2020/0285737 | A1 | * | 9/2020 | Kraus | .................... G06F 21/552 |

OTHER PUBLICATIONS

Singh et al., "An efficient implementation of multi matrix clocks in the distributed system", 2015, IEEE 2015 International Conference on Green Computing and Internet of Things (ICGCIoT), Aug. 10, 2015, 209-213 (Year: 2015).*

* cited by examiner

*Primary Examiner* — Anthony Mejia
(74) *Attorney, Agent, or Firm* — Schiff Hardin LLP (57) ABSTRACT

The present disclosure relates automatically retrieving a workflow with an increased efficiency. The present disclosure further relates to detecting an intrusion in a distributed system, thereby improving system security. The present disclosure relates to a method for automatically retrieving a workflow, a device for automatically retrieving a workflow, a device for detecting an intrusion in a distributed system, and a storage medium for implementing a method according to the present disclosure.

16 Claims, 6 Drawing Sheets

METHOD FOR AUTOMATICALLY RETRIEVING WORKFLOW AND METHOD FOR DETECTING INTRUSION IN DISTRIBUTED SYSTEM

CROSS-REFERENCE TO RELATED APPLICATIONS

The present application claims the benefit of the filing date of China patent application no. 201811485731.4, filed on Dec. 6, 2018, the contents of which are incorporated herein by reference in their entirety.

TECHNICAL FIELD

The present disclosure relates to the field of distributed systems and, in particular, to automatically retrieving a workflow and detecting an intrusion in a distributed system.

BACKGROUND

During the generation of an X-ray, a number of complicated and unstable workflows need to be underwent, for example, in 3D imaging technology. When a workflow is interrupted, it is difficult for a developer or technical support staff member to, from a large amount of transmitted messages, locate the root cause or find out what has happened. The only way of summarizing workflows is by documentation and relying on the experience gained by technical staff. However, it is impossible to find out the work steps necessary for a new, changeable, and complicated workflow. Therefore, difficulty currently exists in retrieving a workflow efficiently.

Moreover, cyber security has become an important topic. When an unauthorized intruder attacks an original system, a planned workflow may be interrupted, resulting in unexpected system behaviors. A conventional distributed system has difficulty in detecting such intrusions by a hacker.

SUMMARY

An embodiment of the present disclosure provides a method for automatically retrieving a workflow in a distributed system, in order to at least solve the conventional problem that it is difficult to efficiently retrieve a workflow in a distributed system.

According to an aspect of an embodiment of the present disclosure, a method for automatically retrieving a workflow is provided; in said method for automatically retrieving a workflow, a distributed system comprises N nodes and a global client, wherein an event that has occurred at each node among the N nodes corresponds to an N-dimensional vector clock, and the vector clock is stored in the global client, the method comprising the following steps: determining a target event in the distributed system; obtaining, based on the vector clock corresponding to the target event, a plurality of events associated with the target event; and sorting the plurality of events in the global client based on the vector clock corresponding to the target event and the vector clock corresponding to each event among the plurality of events, thereby automatically retrieving a workflow.

In a distributed system, where perfect clock synchronization is impossible, a sequence of any pair of events generally cannot be specified by physical time. Thus, Lamport proposed a logical clock, which may digitally capture a sequence of event occurrences. A logical clock is a monotonically increasing software counter, a value of which is independent of any physical clock. However, such a clock has limitations; the magnitude of a logical clock may be deduced by a sequence of event occurrences, but a sequence of event occurrences cannot be deduced by the magnitude of a logical clock. In order to overcome this shortcoming, vector clock has been developed so that a sequence of events or concurrent occurrence of events may be determined by the vector clocks of the events.

Thus, by monitoring with a global client the vector clocks of all the events and sorting the events based on the vector clocks of each event, a workflow starting from a specified target event may be generated automatically, greatly reducing the workload of technical support staff while increasing the work efficiency and accuracy.

According to an exemplary embodiment of the present disclosure, the method includes, before determining a target event in said distributed system, setting, for each node among the N nodes, a corresponding N-dimensional zero vector as an initial vector clock and, when an event has occurred at a node, updating the vector clock of the node.

When work is started, the N nodes in the distributed system are initially set and, when an event has occurred, are updated; thus, each node is monitored by a uniform rule for global monitoring.

According to an exemplary embodiment of the present disclosure, the jth element of the vector clock of the ith node of the N nodes corresponds to an event count value of the jth node of the N nodes that is known about the ith node, wherein updating the vector clock of the node comprises: at the ith node, when a local event has occurred, adding a first predetermined value to the ith element in the vector clock of the ith node; after the ith node sends a message along with a vector clock to the jth node, adding the first predetermined value to the jth element of the vector clock of the jth node, and, if an element greater than a corresponding element in the current vector clock of the jth node exists in the received vector clock of the ith node, updating the corresponding element in the vector clock of the jth node to the element in the vector clock of the ith node.

Thus, the events that have occurred at the node are counted conveniently and effectively. Here, the first predetermined value is preferably set to 1, so as to further simplify the computation.

According to an exemplary embodiment of the present disclosure, the method, before obtaining a plurality of events associated with the target event, comparing the target event with the vector clocks that correspond to all the other events.

Thus, in the global client, by comparing the vector clocks that correspond to each event with the vector clock that corresponds to the target event, the relationships between the events and the target event are obtained.

According to an exemplary embodiment of the present disclosure, comparing the target event with the vector clocks that correspond to all the other events comprises: when each element in the vector clock corresponding to the target event is smaller than or equal to each corresponding element in the vector clocks corresponding to the other events, the other events occurring after the target event; when at least one element greater than the corresponding elements in the vector clocks that correspond to the other events and an element smaller than or equal to the corresponding elements in the vector clocks that correspond to the other events exist at the same time in the vector clock corresponding to the target event, the target event and the other events occurring concurrently.

Thus, the sequences of occurrence of the target event and the other events may be accurately obtained.

According to an exemplary embodiment of the present disclosure, sorting a plurality of events in a global client comprises: grouping, in the global client, M vector clocks corresponding to the plurality of events into a set P0; a eliminating, from the set P0, a vector clock that has each element being minimal (e.g. a number of elements less than some threshold number, a vector clock having the least number of elements, etc.), thereby obtaining a set PM; b. setting the obtained set PM to the set P0; repeating steps a and b until the set PM becomes empty, and then sorting the events that correspond to the eliminated vector clocks in order of elimination sequence, thereby automatically retrieving a workflow.

Thus, the algorithm may be executed by a global client to automatically retrieve a workflow starting from a target event.

According to an exemplary embodiment of the present disclosure, sorting a plurality of events by a global client comprises: with said target event as an initial point, forming each of a plurality of events associated with the target event as vertexes into a directed acyclic graph, wherein an edge of the directed acyclic graph points to an event that occurred subsequently, and all the events are sorted by a topological sorting algorithm, thereby automatically retrieving a workflow.

Said directed acyclic graph refers to a directed graph that has no cycles. Since a normal workflow has no cycles, the events in a workflow generally may form a directed acyclic graph. Thus, events may be sorted more efficiently.

According to an exemplary embodiment of the present disclosure, a topological sorting algorithm comprises: a. finding, in the directed acyclic graph, a zero-in-degree vertex that has only an edge pointing to another vertex; b. deleting from the graph in turn the zero-in-degree vertex and the edge that is connected to the zero-in-degree vertex; repeating steps a and b until all the vertexes have been deleted, and then sorting the vertexes in order of deletion sequence, thereby completing topological sorting.

Said topological sorting refers to linearly sorting vertexes in an acyclic graph. Typical topological sorting algorithms include the Kahn algorithm and DFS-based topological sorting. The algorithm applied herein is the Kahn algorithm. Thus, events may be sorted more conveniently and accurately by a sophisticated algorithm.

According to another aspect of an embodiment of the present disclosure, in order to enhance system security, a method for detecting an intrusion in a distributed system is also provided. Here, the distributed system comprises N nodes and a global client, wherein each node comprises an N-dimensional vector clock, and the global client has global authorization and is secure, the method comprising the following steps: by the global client, storing vector clocks corresponding to events that occurred at the N nodes and generating a corresponding vector clock matrix as a global vector clock table; and by the global client, when an event has occurred, determining, based on the global vector clock table, whether a system intrusion has occurred.

The global client is secure, and is authorized to access all the nodes and record the vector clocks of the events that occurred at each node. The global client monitors in real time the vector clocks of events. Upon detecting an abnormality in an updated vector clock relative to the previous vector clock, the global client determines that a system intrusion has occurred and gives an alarm to prevent generation of an erroneous workflow.

According to an exemplary embodiment of the present disclosure, the method includes, before generating a corresponding vector clock matrix as a global vector clock table: setting, for each node among the N nodes, a corresponding N-dimensional zero vector as an initial vector clock and, when an event has occurred at a node, updating the vector clock of the node.

According to an exemplary embodiment of the present disclosure, the jth element of the vector clock of the ith node of the N nodes corresponds to an event count value of the jth node of the N nodes that is known about the ith node, wherein updating the vector clock of the node comprises: at the ith node, when a local event has occurred, adding a first predetermined value to the ith element in the vector clock of the ith node; after the ith node sends a message along with a vector clock to the jth node, adding the first predetermined value to the jth element of the vector clock of the jth node, and, if an element greater than a corresponding element in the current vector clock of the jth node exists in the received vector clock of the ith node, updating the corresponding element in the vector clock of the jth node to the element in the vector clock of the ith node.

Here, a vector clock is updated in the same manner.

According to an exemplary embodiment of the present disclosure, determining whether a system intrusion has occurred comprises: after the jth node in the distributed system receives a message from the ith node of the system, updating, by the global client, the global vector clock table and, when an element greater than a corresponding element in the ith row and an element smaller than or equal to a corresponding element in the ith row exist at the same in the jth row of the updated global vector clock table, determining that a system intrusion has occurred.

Thus, it is determined that the event of a node receiving a message and the event of the previous node sending a message are concurrent events, which contradicts the fact, and therefore, it is judged that an intrusion has occurred.

According to an exemplary embodiment of the present disclosure, determining whether a system intrusion has occurred comprises: after the jth node in the distributed system receives a message from the ith node of the system, updating, by the global client, the global vector clock table and, when the element in the jth row and the ith column is different from the element in the ith row and the ith column in the updated global vector clock table, determining that a system intrusion has occurred.

Thus, it is found that a message received by the jth node was not updated on the basis of the vector clock from the ith node, which contradicts the fact, and therefore, it is judged that an intrusion has occurred.

According to an exemplary embodiment of the present disclosure, determining whether an intrusion into said system has occurred comprises: after the jth node in the distributed system receives a message from the ith node of the system, updating, by the global client, the global vector clock table, subtracting the updated global vector clock table from the previous global vector clock table to obtain a global vector clock table difference, and when the element in the ith row and the jth column of the global vector clock table difference is equal to a first predetermined value and the element in the ith row and the jth column of the global vector clock table difference is smaller than or equal to a second predetermined value, determining that a system intrusion has occurred.

Here, when a vector clock is updated with the first predetermined value set to 1, the second predetermined value is set to 2.

Thus, by the above-described three judgment rules, it is possible to accurately determine whether a system intrusion has occurred.

According to another aspect of an embodiment of the present disclosure, a device for automatically retrieving a workflow is further provided, comprising: a determination module, configured to determine a target event in a distributed system; an acquisition module, configured to obtain, based on the vector clock corresponding to the target event, a plurality of events associated with the target event; and a sorting module, configured to sort the plurality of events based on the vector clock corresponding to the target event and the vector clock corresponding to each event among the plurality of events, thereby automatically retrieving a workflow.

Thus, by monitoring, with a device for automatically retrieving a workflow, the vector clocks of all the events and sorting the events based on the vector clocks of each event, a workflow starting from a specified target event may be generated automatically, greatly reducing the workload of technical support staff while increasing the work efficiency and accuracy.

According to another aspect of an embodiment of the present disclosure, a device for detecting an intrusion in a distributed system is further provided, comprising: a storage module, configured to store vector clocks corresponding to events that occurred at a plurality of nodes in a distributed system and generate a corresponding vector clock matrix as a global vector clock table; and a determination module, configured to, when an event has occurred, determine, based on the global vector clock table, whether a system intrusion has occurred.

Here, a device for detecting an intrusion in a distributed system is secure, and is authorized to access all the nodes and record the vector clocks of the events that occurred at each node. The device monitors in real time the vector clocks of events. Upon detecting an abnormality in an updated vector clock relative to the previous vector clock, the device determines that a system intrusion has occurred and gives an alarm to prevent generation of an erroneous workflow.

According to another aspect of an embodiment of the present disclosure, a storage medium is further provided, comprising a stored program, wherein the program, when executed, causes the device mounted with the storage medium to implement a method according to the present disclosure.

In an embodiment of the present disclosure, a technical solution of a method for automatically retrieving a workflow based on a vector clock is provided, in order to at least solve the technical problem of difficulty in retrieving a workflow efficiently, achieving a technical effect of automatically retrieving a workflow. In addition, in an embodiment of the present disclosure, a method for detecting an intrusion in a distributed system based on a vector clock is further provided, thereby achieving accurate detection of an intrusion into a distributed system and improving the security of the distributed system.

Preferred embodiments are described below with reference to the accompanying drawings in an explicit and comprehensible manner, and the above characteristics, technical features, advantages, and embodiments of the ankle coil are further described.

BRIEF DESCRIPTION OF THE DRAWINGS/FIGURES

The drawings explained herein are intended to provide a further understanding of the present application and constitute part of the present application. Exemplary embodiments of the present application and descriptions thereof are intended to explain the present application, instead of improperly limiting the present application. Among the drawings.

The drawings include the following reference numerals:

S102: Determine a target event in the distributed system;
S104: Obtain, on the basis of a vector clock, a plurality of events associated with the target event;
S106: Sort the events based on the vector clock corresponding to the target event and the vector clock corresponding to each event among the events, thereby automatically retrieving a workflow;
E1-E14: Event;
A, B, C: Node;
S202: By the global client, store vector clocks corresponding to events that occurred at the N nodes and generate a corresponding vector clock matrix as a global vector clock table;
S204: By the global client, when an event has occurred, determine, based on the global vector clock table, whether a system intrusion has occurred;
Attacker 1: Attacker;
Attacker 2: Attacker;
Attacker 3: Attacker;
E21-E26: Event;
H1-H3: Event;
3: Device for automatically retrieving a workflow;
302: Determination module;
304: Acquisition module;
306: Sorting module;
4: Device for detecting an intrusion in a distributed system;
402: Storage module;
404: Determination module.

DETAILED DESCRIPTION

In order to more clearly understand the technical features, objectives, and effects of the present disclosure, the specific embodiments of the present disclosure are described with reference to the accompanying drawings, and in the drawings, the same number represents components of the same structure or of similar structures but the same function.

The word "exemplary" represents "serving as an instance, example or description" herein, and any illustration and embodiment described as "exemplary" herein should not be interpreted as a more preferred or more advantageous technical solution.

In order for those of ordinary skill in the art to better understand the present application, the technical solution provided in embodiments of the present disclosure will be described clearly and completely with reference to the drawings for embodiments of the present disclosure. Obviously, the described embodiments are only some, but not all, embodiments of the present disclosure. Any embodiments obtained by those of ordinary skill in the art based on the described embodiments of the present disclosure without making inventive efforts fall into the protection scope of the present disclosure.

Note that terms such as "first" and "second" used in the specification and claims of the present disclosure and the above-mentioned drawings are intended to differentiate between similar targets, instead of describing a specific sequence or a precedence relationship. It should be understood that data used this way are interchangeable where appropriate, so that embodiments of the present disclosure described herein may be implemented in a sequence other than any of those shown or described herein. Further, terms "comprising", "provided with", and any variants thereof are intended to cover nonexclusive inclusion. For example, a process, method, system, product, or device comprising a series of steps or modules or units are not necessarily limited to explicitly listed steps or modules or units, and instead may include other steps or modules or units that are not explicitly listed or are intrinsic to these processes, methods, systems, products, or devices.

Figure 1:
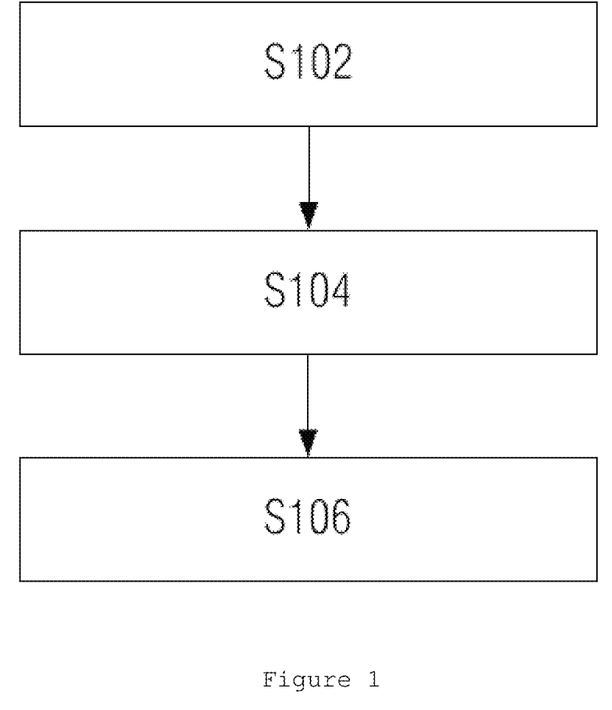
FIG. 1 is an event flowchart for a method for automatically retrieving a workflow according to an embodiment of the present disclosure.

In order to efficiently retrieve a workflow in a distributed system, a method for automatically retrieving a workflow is provided herein. FIG. 1 is an event flowchart for a method for automatically retrieving a workflow based on a vector clock according to an embodiment of the present application. The distributed system comprises N nodes and a global client, wherein each node comprises an N-dimensional vector clock, and the vector clock is stored in the global client, the method, as shown in FIG. 1, comprising the following steps:

S102 of determining a target event in the distributed system, wherein the target event comprises a vector clock generated when the target event occurred; S104 of obtaining, based on the vector clock, a plurality of events associated with the target event; and S106 of sorting the events based on the vector clock corresponding to the target event and the vector clock corresponding to each event among the events, thereby automatically retrieving a workflow that starts from the target event.

Thus, by monitoring, with a global client, the vector clocks of all the events and sorting the events based on the vector clocks of each event, a workflow starting from a specified target event may be generated automatically, greatly reducing the workload of technical support staff while increasing the work efficiency and accuracy.

According to an exemplary embodiment of the present disclosure, said method, before S102, further comprises: setting, for each node among the N nodes, a corresponding N-dimensional zero vector as an initial vector clock and, when an event has occurred at a node, updating the vector clock of the node.

Further, the jth element of the vector clock of the ith node of the N nodes corresponds to an event count value of the jth node of the N nodes that is known about the ith node, wherein updating the vector clock of the node comprises: at the ith node, when a local event has occurred, adding 1 to the ith element in the vector clock of the ith node; after the ith node sends a message along with a vector clock to the jth node, adding 1 to the jth element of the vector clock of the jth node, and, if an element greater than a corresponding element in the current vector clock of the jth node exists in the received vector clock of the ith node, updating the corresponding element in the vector clock of the jth node to the element in the vector clock of the ith node.

According to an exemplary embodiment of the present disclosure, the method includes, before obtaining a plurality of events associated with the target event: comparing the target event with the vector clocks that correspond to all the other events.

Thus, in the global client, by comparing the vector clocks that correspond to each event with the vector clock that corresponds to the target event, the relationships between the events and the target event are obtained.

According to an exemplary embodiment of the present disclosure, comparing the target event with the vector clocks that correspond to all the other events comprises: when each element in the vector clock of the target event is smaller than or equal to each corresponding element in the vector clocks corresponding to the other events, the other events occurring after the target event; when at least one element greater than the corresponding elements in the vector clocks that correspond to the other events and an element smaller than or equal to the corresponding elements in the vector clocks that correspond to the other events exist at the same time in the vector clock corresponding to the target event, the target event and a second event occurring concurrently.

Thus, the sequences of occurrence of the target event and the other events may be accurately obtained.

Figure 2:
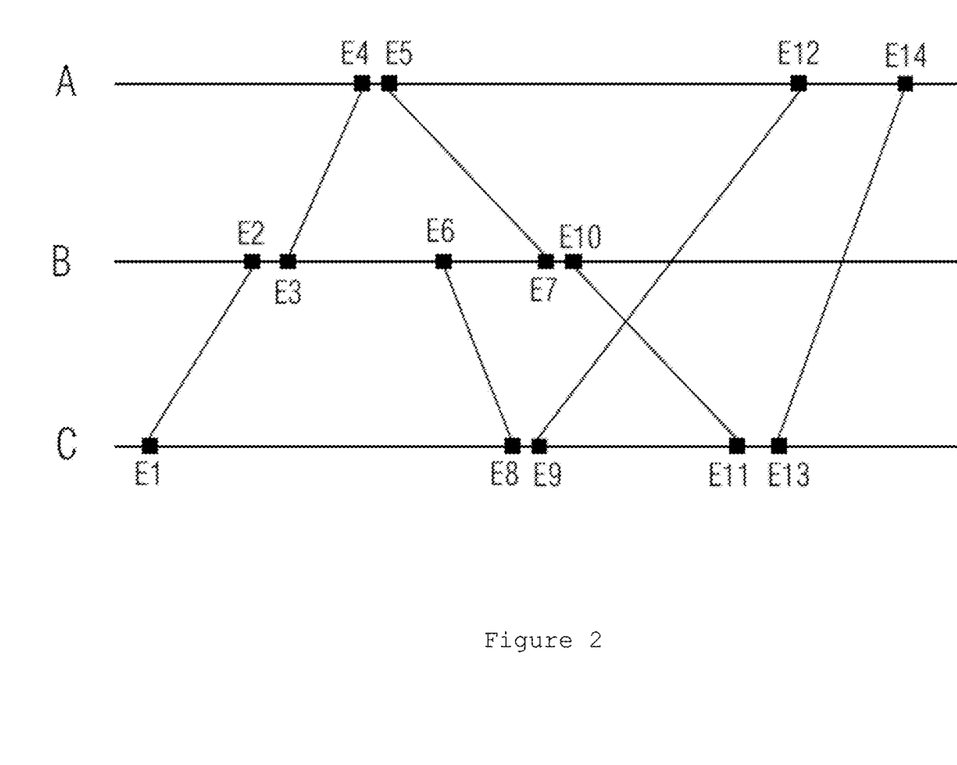
FIG. 2 is a specific example of a flowchart for a workflow in a distributed system according to an embodiment of the present disclosure.

The above-mentioned process will be explained below by giving a specific example of an event flowchart for a workflow in a distributed system according to an embodiment of the present application.

FIG. 2 shows an event flowchart for a workflow in a distributed system. The distributed system comprises three nodes: node A, node B, and node C.

First, an initial vector clock is set for node A, node B, and node C, respectively: $C_A$=[0 0 0], $C_B$=[0 0 0]; and $C_C$=[0 0 0].

In this case, the global vector clock table is:

$$C_G = \begin{bmatrix} 0 & 0 & 0 \\ 0 & 0 & 0 \\ 0 & 0 & 0 \end{bmatrix}.$$

Event E1: When a local event occurs at node C, the clock is increased by 1, thus being updated as:
$C_C$=[0 0 1]; and in this case:

$$C_G = \begin{bmatrix} 0 & 0 & 0 \\ 0 & 0 & 0 \\ 0 & 0 & 1 \end{bmatrix}.$$

Event E2: Then, node C sends a message and the vector clock $C_C$=[0 0 1] to node B. When node B receives the message from node C, the clock of node B is increased by 1, thus being updated to $C_B$=[0 1 0]; $C_B$ and $C_C$ are compared; each element in the vector clock $C_B$ is updated to the corresponding element in the two vector clocks $C_B$ and $C_C$, whichever is larger; in other words, $C_B$ is updated to:

$C_B=[0\ 1\ 1]$; and in this case:

$$C_G = \begin{bmatrix} 0 & 0 & 0 \\ 0 & 1 & 1 \\ 0 & 0 & 1 \end{bmatrix}.$$

Event E3: When a local event occurs at node B, the vector clock is updated to:
$C_B=[0\ 2\ 1]$; this case:

$$C_G = \begin{bmatrix} 0 & 0 & 0 \\ 0 & 2 & 1 \\ 0 & 0 & 1 \end{bmatrix}.$$

Event E4: When node B sends a message and vector clock to node A, the vector clock of node A is increased by 1 to obtain $C_A=[1\ 0\ 0]$; after being compared with the received $C_B=[0\ 2\ 1]$, it is updated to:
$C_A=[1\ 2\ 1]$; in this case:

$$C_G = \begin{bmatrix} 1 & 2 & 1 \\ 0 & 2 & 1 \\ 0 & 0 & 1 \end{bmatrix}.$$

Event E5: When a local event occurs at node A, the vector clock is increased by 1 to obtain:
$C_A=[2\ 2\ 1]$; in this case:

$$C_G = \begin{bmatrix} 2 & 2 & 1 \\ 0 & 2 & 1 \\ 0 & 0 & 1 \end{bmatrix}.$$

Event E6: When a local event occurs at node B, the vector clock is increased by 1 to obtain:
$C_B=[0\ 3\ 1]$; in this case:

$$C_G = \begin{bmatrix} 2 & 2 & 1 \\ 0 & 3 & 1 \\ 0 & 0 & 1 \end{bmatrix}.$$

Event E7: When node A sends a message and vector clock to node B, the vector clock of node B is increased by 1 to obtain $C_B=[0\ 4\ 1]$; after being compared with the received $C_A=[2\ 2\ 1]$, it is updated to:
$C_B[2\ 4\ 1]$; in this case:

$$C_G = \begin{bmatrix} 2 & 2 & 1 \\ 2 & 4 & 1 \\ 0 & 0 & 1 \end{bmatrix}.$$

Event E8: When node C receives a message and vector clock from node B, the vector clock of node C is increased by 1 to obtain $C_C=[0\ 0\ 2]$; after being compared with the received $C_B=[0\ 3\ 1]$, it is updated to:

$C_C=[0\ 3\ 2]$; in this case:

$$C_G = \begin{bmatrix} 2 & 2 & 1 \\ 2 & 4 & 1 \\ 0 & 3 & 2 \end{bmatrix}.$$

Event E9: When a local event occurs at node C, the vector clock is increased by 1 to obtain:
$C_C=[0\ 3\ 3]$; in this case:

$$C_G = \begin{bmatrix} 2 & 2 & 1 \\ 0 & 4 & 1 \\ 0 & 3 & 3 \end{bmatrix}.$$

Event E10: When a local event occurs at node B, the vector clock is increased by 1 to obtain:
$C_B=[2\ 5\ 1]$; in this case:

$$C_G = \begin{bmatrix} 2 & 2 & 1 \\ 2 & 5 & 1 \\ 0 & 0 & 1 \end{bmatrix}.$$

Event E11: When node C receives a message and vector clock from node B, the vector clock of node C is increased by 1 to obtain:
$C_C=[0\ 3\ 4]$; after being compared with the received $C_B=[2\ 5\ 1]$, it is updated to:
$C_C=[2\ 5\ 4]$; in this case":

$$C_G = \begin{bmatrix} 2 & 2 & 1 \\ 2 & 5 & 1 \\ 2 & 5 & 4 \end{bmatrix}.$$

Event E12: When node A receives a message and vector clock from node C, the vector clock of node A is increased by 1 to obtain:
$C_A=[3\ 2\ 1]$; after being compared with the received $C_C=[0\ 3\ 3]$, it is updated to:
$C_A=[3\ 3\ 3]$; in this case:

$$C_G = \begin{bmatrix} 3 & 3 & 3 \\ 2 & 5 & 1 \\ 2 & 5 & 4 \end{bmatrix}.$$

Event E13: When a local event occurs at node C, the vector clock is increased by 1 to obtain:
$C_C=[2\ 5\ 5]$; in this case:

$$C_G = \begin{bmatrix} 2 & 2 & 1 \\ 2 & 5 & 1 \\ 2 & 5 & 5 \end{bmatrix}.$$

Event E14: When node A receives a message and vector clock from node C, the vector clock of node A is increased by 1 to obtain:

$C_A$=[4 3 3]; after being compared with the received $C_C$=[2 5 5], it is updated to:

$C_A$=[4 5 5]; in this case:

$$C_G = \begin{bmatrix} 4 & 5 & 5 \\ 2 & 5 & 1 \\ 2 & 5 & 5 \end{bmatrix}.$$

Here, it can be seen that none of the elements in event E3: $C_B$=[0 2 1] is greater than event E11: $C_C$=[2 5 4]; thus, event E3 occurred before event E11; in other words, E3→E11.

Meanwhile, in the element of event E9: $C_C$=[0 3 3], a corresponding element greater than event E10: $C_B$=[2 5 1] and a corresponding element smaller than or equal to event E10 exist; thus, events E9 and E10 occurred concurrently.

Thus, the workflow has ended. Part of the sequence of event occurrence may be summarized, for example:

E1: $C_C$=[0 0 1]→E2: $C_B$=[0 1 1]→E3: $C_B$=[0 2 1]→E4: $C_A$=[1 2 1]→E5: $C_A$=[2 2 1]→E7: $C_B$=[2 4 1]→E10: $C_B$=[2 5 1]→E11: $C_C$=[2 5 4]→E13: $C_C$=[2 5 5]→E14: $C_A$=[4 5 5].

Thus, a workflow is obtained. In the same manner, the other workflows may also be obtained.

According to an exemplary embodiment of the present disclosure, sorting a plurality of events by a global client comprises: grouping, in the global client, M vector clocks corresponding to the plurality of events into a set $P_0$; a. eliminating, from the set $P_0$, a vector clock that has each element being minimal, thereby obtaining a set $P_M$; b. setting the obtained set $P_M$ to the set $P_0$; repeating steps a and b until the set $P_M$ becomes empty, and then sorting the events that correspond to the eliminated vector clocks in order of elimination sequence, thereby automatically retrieving a workflow.

Thus, the algorithm may be executed by a global client to automatically retrieve a workflow starting from a target event.

Another method, namely, the topological sorting algorithm based on a directed acyclic graph, is mainly described below. Said method comprises: with said target event as an initial point, forming each of a plurality of events associated with the target event as vertexes into a directed acyclic graph, wherein an edge of the directed acyclic graph points to an event that occurred subsequently, and all the events are sorted by a topological sorting algorithm, thereby automatically retrieving a workflow that starts from the target event.

Said directed acyclic graph refers to a directed graph that has no cycles. Since a normal workflow has no cycles, the events in a workflow generally may form a directed acyclic graph. Thus, events may be sorted more efficiently.

According to an exemplary embodiment of the present disclosure, the topological sorting algorithm comprises: a. finding, in the directed acyclic graph, a zero-in-degree vertex that has only an edge pointing to another vertex; b. deleting from the graph in turn the zero-in-degree vertex and the edge that is connected to the zero-in-degree vertex; repeating steps a and b until all the vertexes have been deleted, and then sorting the vertexes in order of deletion sequence, thereby completing topological sorting.

Said topological sorting refers to linearly sorting vertexes in an acyclic graph. Typical topological sorting algorithms include the Kahn algorithm and DFS-based topological sorting. The algorithm applied herein is the Kahn algorithm. Thus, events may be sorted by a sophisticated algorithm to obtain a workflow.

Figure 3:
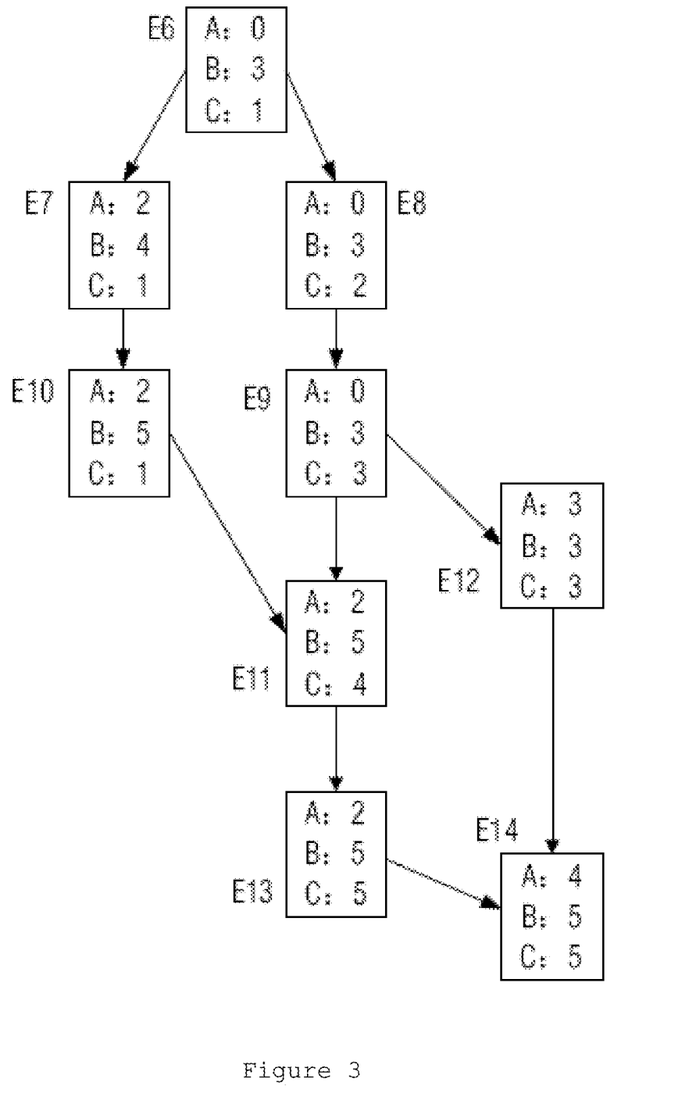
FIG. 3 is a directed acyclic graph formed on the basis of the example shown in FIG. 2.

FIG. 3 shows a directed acyclic graph formed on the basis of the example shown in FIG. 2. An application example of the Kahn algorithm will be described below with reference to FIG. 3. Here, event E6 is selected as the target event; from all the events, event E7, event E8, event E9, event E10, event E11, event E12, event E13, and event E14 that occurred after E6 are selected as vertexes; and directions are added to the edges in the sequence of occurrence of the events based on vector clocks. First, it can be seen that the vertex having an in-degree of 0 is E6; thus, the vertex E6 and its edges pointing to E7 and E8 are deleted. In the remaining graph, the vertexes having an in-degree of 0 are E7 and E8; thus, the vertexes E7 and E8 as well as their edges are deleted. By this method, E10 and E9, and then E11 and E12 are deleted in turn; then, E13 is deleted, and finally E14 is deleted; thus, the final step is E14. Here, it can be seen that E7 and E8, E10 and E9, as well as E11 and E12 are concurrent; the sequences of occurrence of these events cannot be determined. Thus, it is necessary to deduce, forward from E14, a workflow that starts from E6, thereby greatly saving computation resources and time.

The Kahn algorithm for topological sorting based on a directed acyclic graph will be described below, the algorithm comprising:

Step a. Set an empty set L that is to contain all the sorted elements;

Step b. Set a set S that contains all the nodes having an in-degree of 0, determine whether the set S is non-empty, and, if the set S is non-empty, perform the following steps:

Step b1. Delete node n from the set S;

Step b2. Insert node n into the set L;

Step b3. Perform the following steps on each node m that has edge e pointing from n to m:

Step b31. Delete edge e from the graph;

Step b32. If node m has no other entered edge, then insert node m into the set S;

Step c. Judging whether the graph contains an edge;

if an edge is contained, then the algorithm is terminated and it is determined that the graph contains at least one cycle;

if no edge is contained, then the algorithm is terminated and the set L is obtained; the sequence of topological sorting is determined by the sequence of the elements in the set L.

Figure 4:
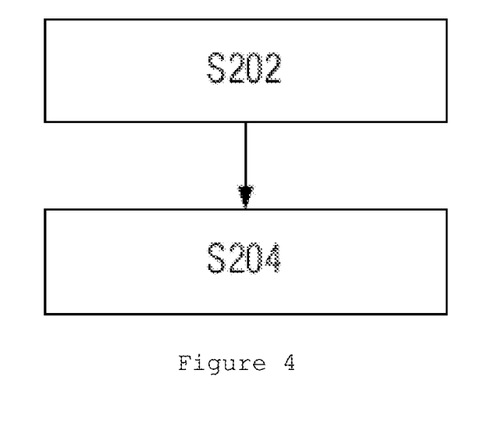
FIG. 4 is a flowchart for a method for detecting an intrusion in a distributed system according to an embodiment of the present disclosure.

According to another aspect of an embodiment of the present disclosure, a method for detecting an intrusion in a distributed system based on a vector clock is further provided. FIG. 4 shows a flowchart for a method for detecting an intrusion in a distributed system based on a vector clock, wherein the distributed system comprises N nodes and a global client, wherein each node comprises an N-dimensional vector clock, and the global client has global authorization, the method comprising the following steps: S202: By the global client, store vector clocks corresponding to events that occurred at the N nodes and generate a corresponding vector clock matrix as a global vector clock table; and S204: By the global client, when an event has occurred, determine, based on the global vector clock table, whether a system intrusion has occurred.

The global client is secure, and is authorized to access all the nodes and record the corresponding vector clocks of the events that occurred at each node. The global client monitors in real time the vector clocks of events. Upon detecting an abnormality in an updated vector clock relative to the previous vector clock, the global client determines that a system intrusion has occurred and gives an alarm to prevent generation of an erroneous workflow.

The rules for determining whether a system intrusion has occurred are as follows:

1. After the jth node in the distributed system receives a message from the ith node of the system, update, by the global client, the global vector clock table and, when an element greater than a corresponding element in the ith row and an element smaller than or equal to a corresponding element in the ith row exist at the same in the jth row of the updated global vector clock table, determine that a system intrusion has occurred;

2. After the jth node in the distributed system receives a message from the ith node of the system, update, by the global client, the global vector clock table and, when the element in the jth row and the ith column is different from the element in the ith row and the ith column in the updated global vector clock table, determine that a system intrusion has occurred; and 3. After the jth node in the distributed system receives a message from the ith node of the system, update, by the global client, the global vector clock table, subtract the updated global vector clock table from the previous global vector clock table to obtain a global vector clock table difference, and when the element in the ith row and the jth column of the global vector clock table difference is equal to 1 and the element in the ith row and the jth column of the global vector clock table difference is smaller than or equal to a second predetermined value, determine that a system intrusion has occurred. Here, when a vector clock is updated with the first predetermined value set to 1, the second predetermined value is set to 2.

Figure 5:
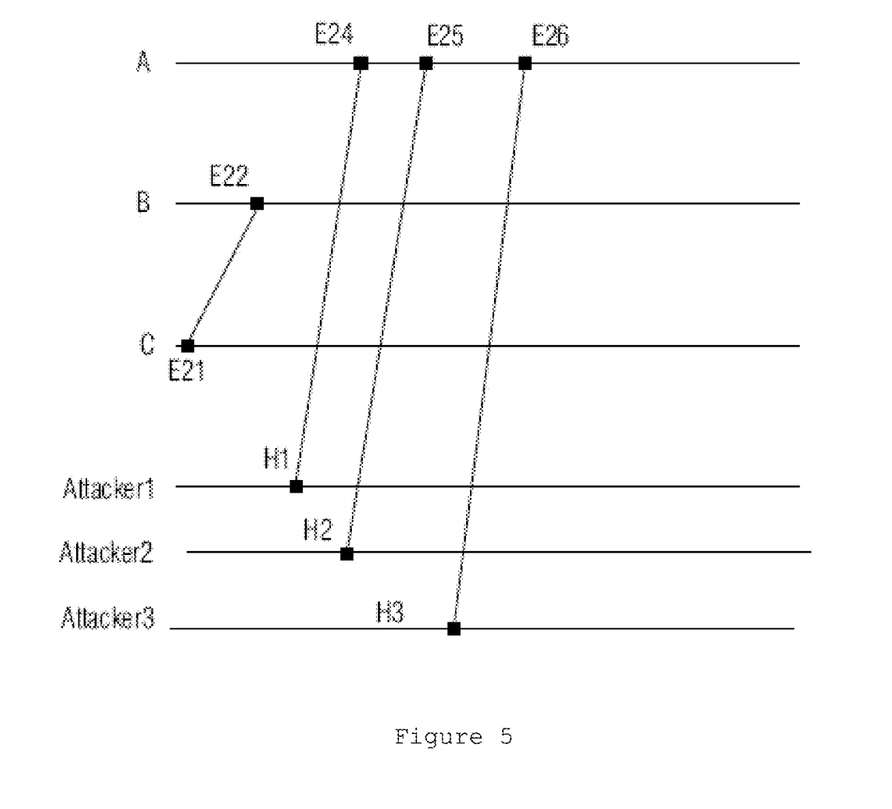
FIG. 5 is an event flowchart for a distributed system that is subjected to three types of intrusion attacks according to an embodiment of the present disclosure.

How a global client judges whether a system intrusion has occurred will be described below with reference to FIG. 5. In the distributed system shown in FIG. 5, which consists of node A, node B, and node C, three attackers, namely, Attacker 1, Attacker 2, and Attacker 3, attempt to disguise themselves as node B and send a message to node A, so as to continue the flow.

First, an initial vector clock is set for node A, node B, and node C, respectively:

$C_A=[0\ 0\ 0]$, $C_B=[0\ 0\ 0]$, and $C_C=[0\ 0\ 0]$; in this case, the global vector clock table is:

$$C_G = \begin{bmatrix} 0 & 0 & 0 \\ 0 & 0 & 0 \\ 0 & 0 & 0 \end{bmatrix}.$$

A local event occurs at node C, and the vector clock is increased by 1 to obtain:

$C_C=[0\ 0\ 1]$; in this case, the global vector clock table is:

$$C_G = \begin{bmatrix} 0 & 0 & 0 \\ 0 & 0 & 0 \\ 0 & 0 & 1 \end{bmatrix}.$$

Then, node C sends a message and a vector clock together to node B; when node B receives the message, the vector clock is increased by 1 to obtain:

$C_B=[0\ 1\ 0]$, and the clock is updated to:
$C_B=[0\ 1\ 1]$ after comparison; in this case, the global vector clock table is:

$$C_G = \begin{bmatrix} 0 & 0 & 0 \\ 0 & 1 & 1 \\ 0 & 0 & 1 \end{bmatrix}.$$

Node B decides not to continue the workflow; Attacker 1 disguises itself as node B and sends a message to node A by event H1 that has a vector clock of $C_{B1}=[0\ 2\ 1]$; when node A receives the message, namely, after occurrence of event E24, the vector clock is increased by 1, which is updated to:

$C_A[1\ 2\ 1]$; in this case, the global vector clock table is:

$$C_G = \begin{bmatrix} 1 & 2 & 1 \\ 0 & 1 & 1 \\ 0 & 0 & 1 \end{bmatrix}.$$

It can be seen that after node A receives a message from node B, an element of node A that corresponds to node B should be the same as that of node B; that is, it should be 1; however, it is 2 in this case, which does not obey the rules; therefore, the global client determines that a system intrusion has occurred.

Meanwhile, Attacker 2 disguises itself as node B and sends a message to node A by event H2 that has a vector clock of $C_{B2}=[0\ 0\ 1]$; when node A receives the message, namely, after occurrence of event E25, the vector clock is increased by 1, which is updated to:

$C_A=[1\ 0\ 1]$; in this case, the global vector clock table is:

$$C'_G = \begin{bmatrix} 1 & 0 & 1 \\ 0 & 1 & 1 \\ 0 & 0 & 1 \end{bmatrix}.$$

It can be seen that events E25 and E22 occurred concurrently, which does not obey the rules; therefore, the global client determines that a system intrusion has occurred.

In addition, Attacker 3 disguises itself as node B and sends a message to node A by event H3 that has a vector clock of $C_{B3}=[0\ 1\ 1]$; when node A receives the message, namely, after occurrence of event E26, the vector clock is increased by 1, which is updated to:

$C_A[1\ 1\ 1]$; in this case, the global vector clock table is:

$$C'_G = \begin{bmatrix} 1 & 1 & 1 \\ 0 & 1 & 1 \\ 0 & 0 & 1 \end{bmatrix}.$$

Generally, the workflow that occurs at a node may be summarized as follows:

1) A message is received, and the vector clock $C_{ii}$ increases;
2) A local event occurs, and the vector clock $C_{ii}$ increases;
3) The message and vector clock are sent.

The global vector clock table $C_C=C_{ii}$, $1 \leq i \leq n$, $1 \leq j \leq n$ is given. When the jth node receives the message, a local event occurs; then, the message and vector clock are sent to the ith node; the jth element of the vector clock of the jth node increases twice; in this case, the vector clock table changes to:

$$C'_G = \begin{bmatrix} C_{11} & \cdots & C_{1j} & \cdots & C_{1n} \\ \vdots & \ddots & & & \vdots \\ C'_{j1} & & C'_{ij}+2 & & C'_{jn} \\ \vdots & & & \ddots & \vdots \\ C_{n1} & \cdots & C_{nj} & \cdots & C_{nn} \end{bmatrix}$$

When the ith node receives the message, the vector clock table changes to:

$$C''_G = \begin{bmatrix} C_{11} & & & & C_{1n} \\ C'_{i1} & C_{ii}+1 & C_{jj}+2 & & C'_{in} \\ C_{j1} & & C_{jj}+2 & & C'_{jn} \\ C_{n1} & & & & C_{nn} \end{bmatrix},$$

and
the difference between them is:

$$\Delta C = C''_G - C'_G$$
$$= \begin{bmatrix} 0 & \cdots & & & 0 \\ C'_{i1}-C_{i1} & 1 & C_{jj}+2-C_{ij} & C'_{in}-C_{in} \\ \vdots & & & & \vdots \\ 0 & \cdots & & & 0 \end{bmatrix}$$

since $C_{ij} \geq C_{ij}$, $C_{jj}+2-C_{ij} \geq 2$ is established; in other words, after the ith node receives a message from the jth node, the element in the ith row and the ith column of the difference $\Delta C$ between the global vector clock tables should be 1, while the element in the ith row and the jth column should be greater than or equal to 2.

In the case of Attacker 3, $$C'_G - C_G = \begin{bmatrix} 1 & 1 & 1 \\ 0 & 1 & 1 \\ 0 & 0 & 1 \end{bmatrix} - \begin{bmatrix} 0 & 0 & 0 \\ 0 & 1 & 1 \\ 0 & 0 & 1 \end{bmatrix}$$
$$= \begin{bmatrix} 1 & 1 & 1 \\ 0 & 0 & 0 \\ 0 & 0 & 0 \end{bmatrix},$$

and it can be seen that the element in the Ath row and the Bth column of the difference between the global vector clock tables is 1, which is smaller than 2, then it is determined that a system intrusion has occurred.

Thus, by the general rules, it is possible to accurately determine whether a system intrusion has occurred.

In summary, an embodiment of the present disclosure provides a method for automatically retrieving a workflow in a distributed system, in order to at least solve the problem with the prior art that it is difficult to efficiently retrieve a workflow in a distributed system. Further, in another aspect, a method for detecting an intrusion in a distributed system is provided, thereby enhancing system security.

Figure 6:
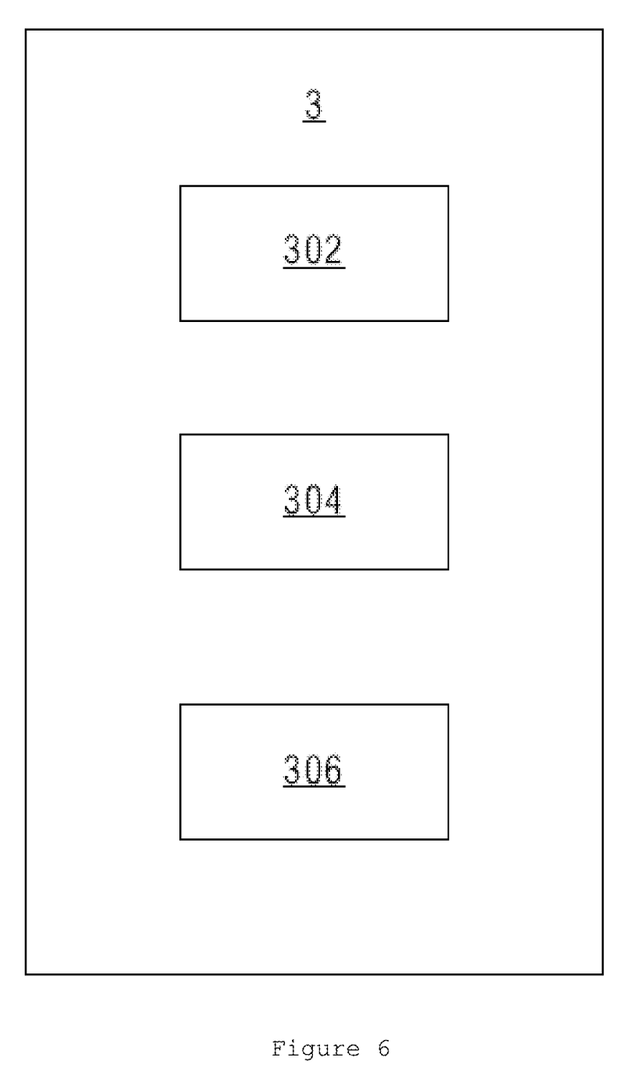
FIG. 6 is a block diagram for a device for automatically retrieving a workflow according to an embodiment of the present disclosure.

According to another aspect of an embodiment of the present disclosure, a device for automatically retrieving a workflow is further provided. FIG. 6 is a block diagram for a device for automatically retrieving a workflow according to an embodiment of the present disclosure. As shown in FIG. 6, the device 3 for automatically retrieving a workflow comprises:

a determination module 302, configured to determine a target event in a distributed system;

an acquisition module 304, configured to obtain, based on the vector clock corresponding to the target event, a plurality of events associated with the target event; and a sorting module 306, configured to sort the plurality of events based on the vector clock corresponding to the target event and the vector clock corresponding to each event among the plurality of events, thereby automatically retrieving a workflow.

A method for implementing the device 3 for automatically retrieving a workflow according to an embodiment of the present application is the same as a method for automatically retrieving a workflow as described with reference to FIG. 1. To avoid repetitions, no similar descriptions will be provided again.

Figure 7:
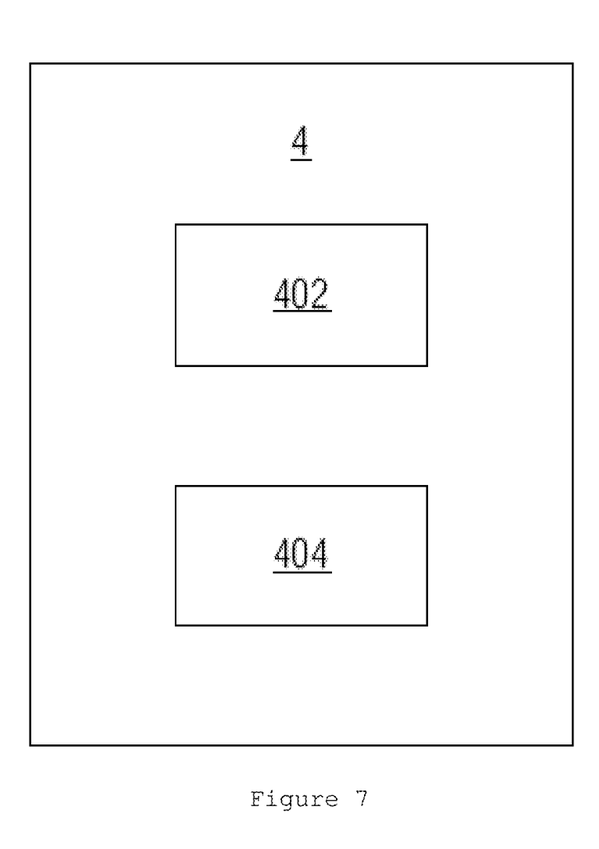
FIG. 7 is a block diagram for a device for detecting an intrusion in a distributed system according to an embodiment of the present disclosure.

According to another aspect of an embodiment of the present disclosure, a device for detecting an intrusion in a distributed system is further provided. FIG. 7 is a block diagram for a device for detecting an intrusion in a distributed system according to an embodiment of the present disclosure. As shown in FIG. 7, the device 4 for detecting an intrusion in a distributed system comprises:

a storage module 402, configured to store vector clocks corresponding to events that occurred at a plurality of nodes in a distributed system and generate a corresponding vector clock matrix as a global vector clock table; and a determination module 404, configured to, when an event has occurred, determine, based on the global vector clock table, whether a system intrusion has occurred.

A method for implementing the device 4 for detecting an intrusion in a distributed system according to an embodiment of the present disclosure is the same as a method for detecting an intrusion in a distributed system as described with reference to FIG. 4. To avoid repetitions, no similar descriptions will be provided again.

According to another aspect of an embodiment of the present disclosure, a storage medium is further provided, comprising a stored program, wherein the program, when executed, causes the device mounted with the storage medium to implement the above-described method according to the present disclosure.

In each of the above-described embodiments of the present disclosure, particular emphasis is put on an aspect, respectively; for a part not detailed in an embodiment, references may be made to relevant descriptions in other embodiments.

It should be understood that the technical contents disclosed in the embodiments provided by the present disclosure may be implemented by other methods. The above-described apparatus embodiment is illustrative. For example, the division of said units or modules is only logical function division, and an alternative division method may be employed in actual implementation. For example, a plurality of units or modules may be combined or integrated into another system, or certain characteristics may be ignored or not be executed. In addition, the shown or discussed mutual coupling or direct coupling or communication connection may be established via certain interfaces, and indirect coupling or communication connection between modules or units may be electrical or in any other form.

Said units or modules described as separate components may or may not be physically separated. Components shown as units or modules may or may not be physical units or modules; in other words, they may be located in the same place or may be distributed on a plurality of network units or modules. An objective of the technical solution of an embodiment may be achieved by selecting some or all of the units or modules based on actual needs. Moreover, the various modules described herein (e.g. those described with respect to FIGS. 3 and 4) may be implemented as any suitable combination of hardware and software. For instance, the modules may be realized as stored computer-readable instructions that are accessed and/or executed via one or more hardware processors (e.g. processing circuitry associated with one or more processors). As another example, the modules may be implemented exclusively via hardware.

Further, the functional units or modules in each embodiment of the present disclosure may be integrated in one processing unit or module, or each of the functional units or modules may exist physically and separately, or two or more units or modules may be integrated in one unit or module. Said integrated unit or module may be implemented in the form of hardware or may be implemented in the form of a software functional unit or module.

To be implemented in the form of a software functional unit and sold or used as a standalone product, said integrated unit may be stored in a computer-readable storage medium (e.g. a non-transitory computer-readable medium). Based on such an understanding, the technical solution of the present disclosure essentially, or for a part contributing to the prior art, or for all or part of the technical solution, may be embodied in the form of a software product. The computer software product is stored in a storage medium, comprising a plurality of instructions for causing a computer device (e.g. processing circuitry, one or more hardware processors, a personal computer, server, network device, etc.) to execute all or part of the steps of the method described in each embodiment of the present application. Examples of the above-described storage medium include USB drive, Read-Only Memory (ROM), Random Access Memory (RAM), movable hard disk, magnetic disk, CD-ROM, or any other medium that can store program code.

While the present disclosure has been particularly described above with reference to preferred embodiments, it should be understood that those of ordinary skill in the art can make various improvements and modifications without departing from the principle of the present disclosure, and such improvements and modifications should also be deemed to fall into the protection scope of the present disclosure.

What is claimed is:

1. A method for automatically retrieving a workflow, the method comprising:
    determining, via one or more processors, a target event in a distributed system including N nodes and a global client, wherein an event that has occurred at each node among the N nodes corresponds to an N-dimensional vector clock, the vector clock being stored in the global client;
    obtaining, via the one or more processors, a plurality of events associated with the target event; and
    sorting, via the one or more processors, the plurality of events based on (i) the vector clock corresponding to the target event, and (ii) the vector clock corresponding to each event from among the plurality of events, to thereby automatically retrieve a workflow.

2. The method as claimed in claim 1, further comprising:
    prior to the act of determining the target event, setting, for each node from among the N nodes, a corresponding N-dimensional zero vector as an initial vector clock; and
    updating the vector clock of a respective node from among the N nodes when an event has occurred at that node.

3. The method as claimed in claim 2, wherein the jth element of the vector clock of the ith node of the N nodes corresponds to an event count value of the jth node of the N nodes about the ith node, and
    wherein the act of updating the vector clock of the node comprises:
        at the ith node, adding a first predetermined value to the ith element in the vector clock of the ith node when a local event has occurred;
        after the ith node sends a message along with a vector clock to the jth node, adding the first predetermined value to the jth element of the vector clock of the jth node; and
        when an element greater than a corresponding element in the current vector clock of the jth node exists in a received vector clock of the ith node, updating the corresponding element in the vector clock of the jth node to the element in the vector clock of the ith node.

4. The method as claimed in claim 1, further comprising:
    prior to obtaining a plurality of events associated with the target event, comparing the target event with the vector clocks that correspond to each respective one of the other events.

5. The method as claimed in claim 4, wherein the act of comparing the target event comprises:
    when each element in the vector clock corresponding to the target event is less than or equal to each corresponding element in the vector clocks corresponding to each respective one of the other events, determining that each respective one of the other events occur after the target event; and
    when (i) at least one element greater than the corresponding elements in the vector clocks that correspond to each respective one of the other events, and (ii) an element less than or equal to the corresponding elements in the vector clocks that correspond to each respective one of the other events exist at the same time in the vector clock corresponding to the target event, determining that the target event and each respective one of the other events occur concurrently.

6. The method as claimed in claim 1, wherein the act of sorting the plurality of events comprises:
    grouping, in the global client, M vector clocks corresponding to each respective one of the plurality of events into a set P0;
    eliminating, from the set P0, a vector clock that has the least number of elements to obtain a set PM;
    setting the obtained set PM to the set P0; and
    repeating the acts of (i) grouping the M vector clocks, and (ii) eliminating the vector clock that has the least number of elements until the set PM becomes empty; and
    sorting the events that correspond to the eliminated vector clocks in order of elimination sequence, thereby automatically retrieving the workflow.

7. The method as claimed in claim 1, wherein the act of sorting the plurality of events comprises:
with the target event as an initial point, forming a plurality of events associated with the target event as vertexes into a directed acyclic graph, wherein an edge of the directed acyclic graph points to an event that occurred subsequently, and the plurality of events are sorted by a topological sorting algorithm, thereby automatically retrieving the workflow.

8. The method as claimed in claim 7, wherein the topological sorting algorithm comprises:
finding, in the directed acyclic graph, a zero-in-degree vertex that has an edge pointing to only one other vertex;
sequentially deleting from the graph (i) the zero-in-degree vertex, and (ii) the edge that is connected to the zero-in-degree vertex; and
repeating the acts of (i) finding the zero-in-degree vertex, and (ii) sequentially deleting the zero-in-degree vertex and the edge that is connected to the zero-in-degree vertex until all vertexes have been deleted; and
sorting the vertexes in order of their deletion sequence, thereby completing the topological sorting.

9. A method for detecting an intrusion in a distributed system that includes N nodes and a global client, each node comprising an N-dimensional vector clock, and the global client being secure and utilizing global authorization, the method comprising:
storing, via the global client, vector clocks corresponding to events that occurred among each node of the N nodes;
generating, via the global client, a corresponding vector clock matrix as a global vector clock table; and
when an event has occurred, determining via the global client, based on the global vector clock table, whether an intrusion into the distributed system has occurred.

10. The method as claimed in claim 9, further comprising:
prior to generating the corresponding vector clock matrix as the global vector clock table, setting, for each node among the N nodes, a corresponding N-dimensional zero vector as an initial vector clock; and,
when an event has occurred at a node, updating the vector clock of the node.

11. The method as claimed in claim 10, wherein the jth element of the vector clock of the ith node of the N nodes corresponds to an event count value of the jth node of the N nodes about the ith node, and
wherein the act of updating the vector clock of the node comprises:
at the ith node, adding a first preset value to the ith element in the vector clock of the ith node when a local event has occurred;
after the ith node sends a message along with a vector clock to the jth node, adding the first predetermined value to the jth element of the vector clock of the jth node; and
when an element greater than a corresponding element in the current vector clock of the jth node exists in the received vector clock of the ith node, updating the corresponding element in the vector clock of the jth node to the element in the vector clock of the ith node.

12. The method as claimed in claim 9, wherein the act of determining whether an intrusion into the distributed system has occurred comprises:
after the jth node in the distributed system receives a message from the ith node of the distributed system, updating, via the global client, the global vector clock table; and
determining that an intrusion into the distributed system has occurred when (i) an element greater than a corresponding element in the ith row, and (ii) an element less than or equal to a corresponding element in the ith row exist at the same in the jth row of the updated global vector clock table.

13. The method as claimed in claim 9, wherein the act of determining whether an intrusion into the distributed system has occurred comprises:
after the jth node in the distributed system receives a message from the ith node of the distributed system, updating, via the global client, the global vector clock table; and
determining that an intrusion into the distributed system has occurred when (i) the element in the jth row and the ith column is different from (ii) the element in the ith row and the ith column in the updated global vector clock table.

14. The method as claimed in claim 9, wherein the act of determining whether an intrusion into the distributed system has occurred comprises:
after the jth node in the distributed system receives a message from the ith node of the distributed system, updating, via the global client, the global vector clock table;
subtracting the updated global vector clock table from the previous global vector clock table to obtain a global vector clock table difference; and
determining that an intrusion into the distributed system has occurred when (i) the element in the ith row and the jth column of the global vector clock table difference is equal to a first predetermined value and (ii) the element in the ith row and the jth column of the global vector clock table difference is smaller than or equal to a second predetermined value.

15. A device for automatically retrieving a workflow, comprising:
a memory configured to store executable instructions; and
processing circuitry configured to read the executable instruction stored in the memory to:
determine a target event in a distributed system;
obtain, based on a vector clock corresponding to the target event, a plurality of events associated with the target event; and
sort the plurality of events based on (i) the vector clock corresponding to the target event, and (ii) the vector clock corresponding to each event from among the plurality of events, thereby automatically retrieving a workflow.

16. A device for detecting an intrusion in a distributed system, comprising:
a memory configured to store vector clocks corresponding to events that occurred at a plurality of nodes in a distributed system; and
processing circuitry configured to generate a corresponding vector clock matrix of the stored vector clocks as a global vector clock table and to determine, when an event has occurred, whether an intrusion into the distributed system has occurred based on the global vector clock table.

* * * * *